Figure 1:
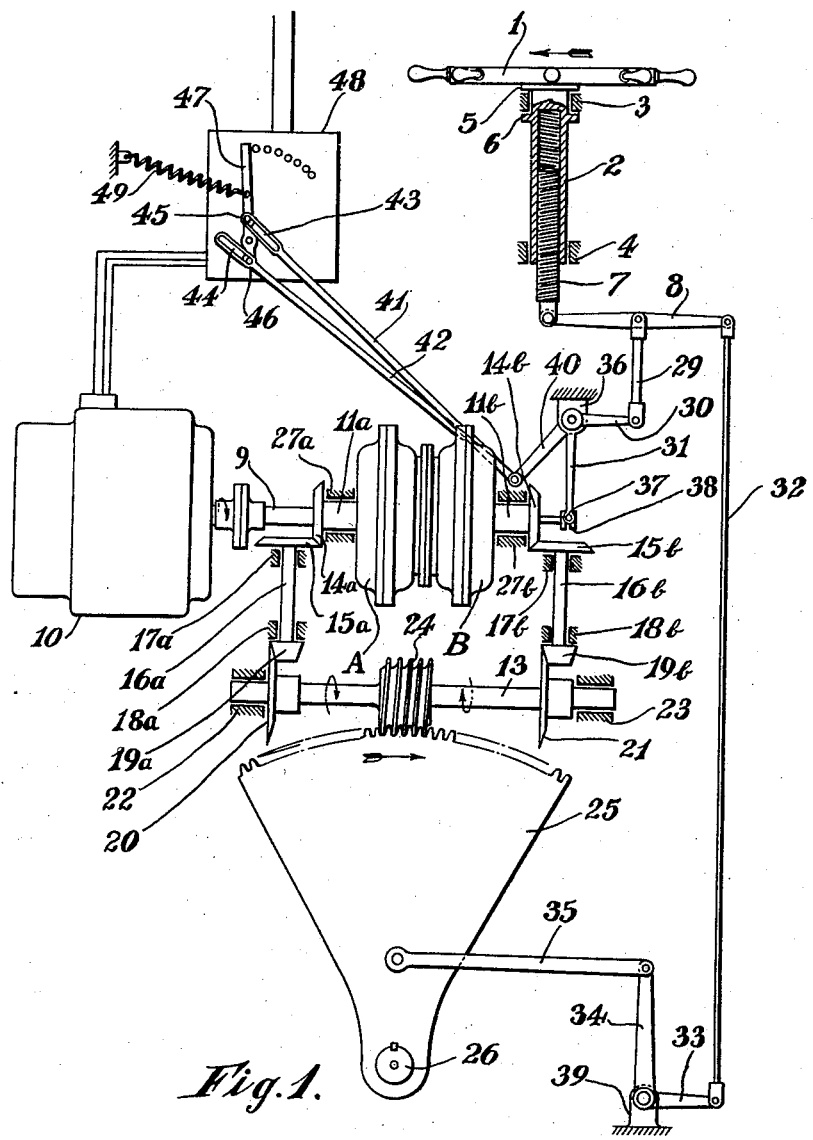

Dec. 27, 1938.                H. SINCLAIR                2,141,940
                  HYDRAULIC POWER TRANSMISSION SYSTEM.
                      Filed June 6, 1936        3 Sheets-Sheet 2

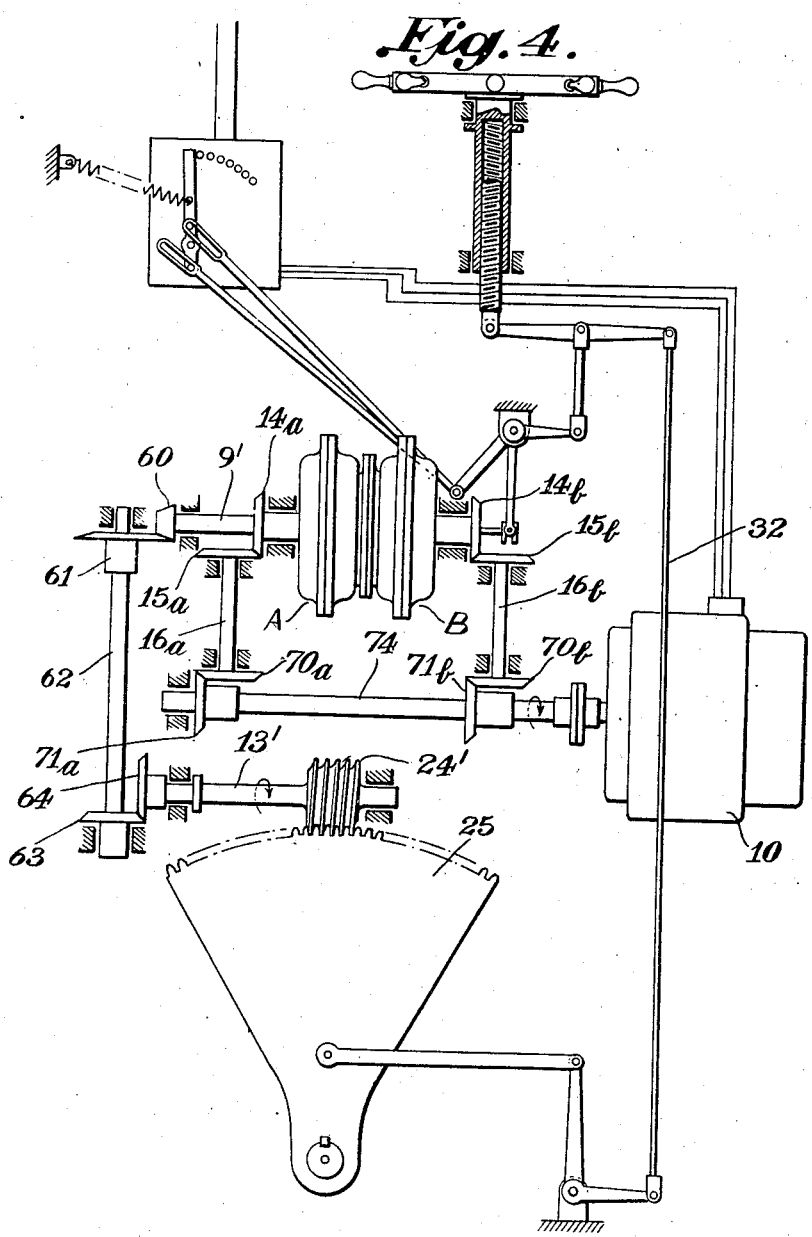

Patented Dec. 27, 1938

2,141,940

UNITED STATES PATENT OFFICE 2,141,940

HYDRAULIC POWER TRANSMISSION SYSTEM

Harold Sinclair, Kensington, London, England

Application June 6, 1936, Serial No. 83,845
In Great Britain June 14, 1935

16 Claims. (Cl. 60—54)

The present invention relates to hydraulic power transmission systems of the kind adapted to impart a reversible motion to a driven machine especially for servo-control systems in which it is desired that the movement of the driven machine shall respond immediately and closely to the movement of the control. Hence it is desirable for such systems to maintain a substantially constant control characteristic over long periods of service without adjustment.

An object of the present invention is to provide a hydraulic power transmission system having these desirable features.

According to the present invention the improved hydraulic power transmission system comprises a driving member adapted to rotate continuously, a displaceable driven member, two hydraulic power transmitters of the kinetic type the impeller elements of which are in permanent driving connection with said driving member and the runner elements of which are in permanent driving connection with said driven member, the arrangement being such that said hydraulic power transmitters tend to drive said driven member in opposite directions respectively, the hydraulic power transmitters being each provided with controllable throttling means, such for example as adjustable vanes or a movable baffle member, adapted to be moved from an inoperative position to obstruct the hydraulic working circuit of the transmitter, and a control member for said throttling means, so arranged as to be capable of moving them alternatively so as to render the respective hydraulic circuits unobstructed, in such manner that at least one circuit is always substantially obstructed by its respective throttling means.

The hydraulic power transmitters may be adapted to operate with a substantially constant liquid content; thus they may be hydraulic couplings of the constant-filling Vulcan-Sinclair type. Where hydraulic couplings are used, they may be provided with a reservoir capable of holding a part of the liquid content of the working circuit and rotatable with the coupling impeller or runner, and with means for transferring liquid automatically between the working circuit and the reservoir. Such couplings are here regarded as being adapted to operate with a substantially constant liquid content, since it is not possible to vary the combined liquid content of the working circuit and reservoir while they are rotating.

When the hydraulic circuit of a transmitter of the kinetic type is obstructed by a baffle member or by movable vanes, the transmitter is still capable of transmitting a substantial torque, although this torque is only a small fraction of the torque transmitted under corresponding conditions but with the baffle inoperative. Thus with the improved arrangement, when both baffles are operative, the torques of the "forward" and "reverse" transmitters balance and the driven member is stationary. If now the baffle of say, the "forward" transmitter is moved towards its inoperative position, the baffle of the "reverse" transmitter remaining operative, the torque on the driven member in the forward sense exceeds that in the reverse sense, and the driven member is therefore rotated in the forward direction. In consequence, the runner element of the "reverse" hydraulic transmitter is rotated in a direction opposite to the rotation of the impeller of that transmitter. I have ascertained that, with at least certain kinds of hydraulic power transmitter of the kinetic type, for example a Vulcan-Sinclair coupling, this opposite rotation does not greatly increase the torque transmitted compared with the torque transmitted when the runner was stalled.

Furthermore the torque transmitted when the impeller and runner are rotating oppositely is very much lower than the torque that would be transmitted if the same slip (expressed as relative rotation of impeller and runner) occurred with one of these elements stationary. As a result the power lost in the throttled power transmitter in the improved arrangement is conveniently low, both when stalled and with the driving and driven elements rotating in opposite directions.

Experiments have shown that when one ring valve is fully open and the driven shaft is stationary, the torque thereon, with constant speed of the driving member, is between about 7 to 12 times the equal opposing torques that were imposed thereon when the control member was in neutral, the exact figure depending on the size of the rotating reservoir, if provided, and the degree of filling, consequently the driven shaft responds rapidly to movement of the control lever. Furthermore, since, as already explained, the reverse torque due to the throttled coupling does not increase very much when its impeller and runner rotate in opposite directions, a powerful driving torque is exerted on the driven shaft up to low values of slip in the unthrottled coupling.

The invention is illustrated by way of example in the accompanying diagrammatic drawings, in which:—

Figure 2:
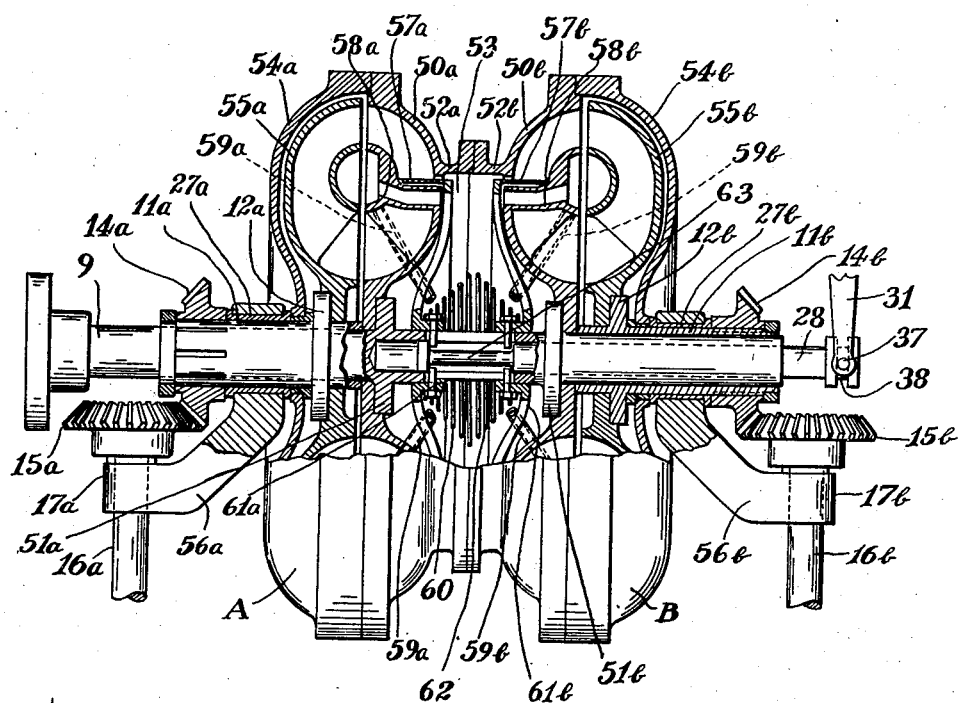
Figure 3:
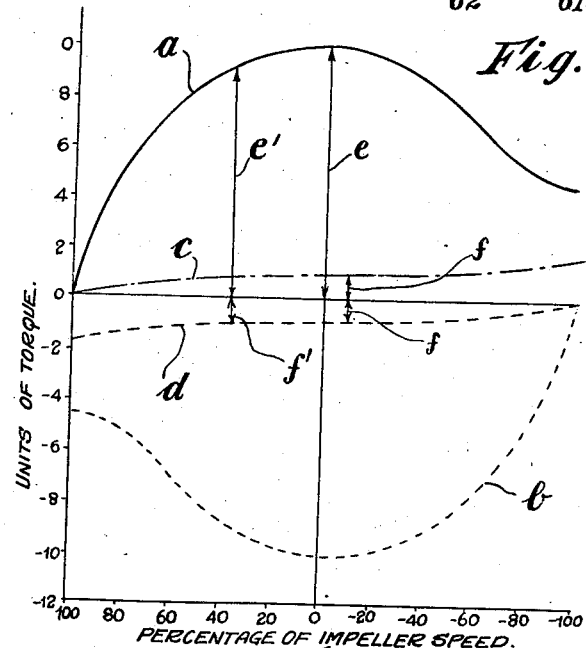

Fig. 1 illustrates a ship's steering gear embodying a hydraulic power transmission system according to the present invention, Fig. 2 illustrates one form of "back-to-back" hydraulic coupling suitable for use in the said power transmission system, Fig. 3 is a graph showing characteristic curves for a coupling such as that shown in Fig. 2, and Fig. 4 illustrates another example of a ship's steering gear embodying a hydraulic power transmission system according to the present invention.

Referring to Fig. 1, the ship's steering gear is provided with the usual steering wheel 1 which is fixed to a hollow shaft 2 mounted in bearings 3 and 4. The bearing 3 is disposed between the boss 5 of the steering wheel and a flange 6 on the shaft 2 and thus prevents axial displacement of the said shaft which is threaded internally to receive and engage a screw-threaded rod 7. The outer end of this rod 7 is pivotally connected to one extremity of a floating lever 8 forming part of a link-work which controls the operation of a "back-to-back" coupling A, B in a manner which will be described later.

The "back-to-back" coupling comprises two hydraulic couplings A and B of the kinetic type which are arranged with their impeller elements back to back and fixed to a common driving shaft 9 connected for rotation with the shaft of a motor 10. The two runner elements of these couplings are fixed respectively to two hollow shafts 11a and 11b which are co-axial with the driving shaft 9 and are journalled in bearings 27a and 27b. The hollow shafts 11a and 11b are connected to a driven shaft 13 in such a manner that the runners, if they rotate, are constrained to do so in opposite directions at equal speeds. The gearing interconnecting the hollow shafts 11a and 11b and the driven shaft 13 consists of two bevel wheels 14a and 14b fixed to the ends of the hollow shafts 11a and 11b and meshing with bevel wheels 15a and 15b fixed to one end of shafts 16a and 16b journalled in bearings 17a, 18a and 17b, 18b. At the other end of shafts 16a and 16b are fixed further bevel wheels 19a and 19b which mesh respectively with bevel wheels 20 and 21 fixed to the driven shaft 13. The shaft 13 is mounted in bearings 22 and 23 and has fixed on it a worm 24 which meshes with a quadrant lever 25 keyed on the rudder post 26.

The hydraulic couplings A and B are provided with baffle members or movable vanes by means of which their hydraulic circuits are adapted to be obstructed. The coupling is provided with an axially slidable control rod 28 and when this control rod occupies the mid position shown, both hydraulic circuits are obstructed, the torques transmitted to the shafts 11a and 11b are low and balance so that the driven shaft 13 remains stationary. If, however, on the one hand the rod 28 is slid to the right in the figure, the hydraulic circuit of coupling A will become unobstructed, while that of coupling B remains obstructed; consequently the torque transmitted to the shaft 11a will considerably exceed that delivered to the shaft 11b and the driven shaft 13 will be rotated in the direction indicated by the arrow on the left of the worm 24, the motor shaft being assumed to rotate continuously in the direction shown by the arrow thereon. If, on the other hand, the rod 28 is slid to the left in the figure, the hydraulic circuit of coupling B will become unobstructed and that of coupling A will be obstructed; consequently the torque transmitted to the shaft 11b will considerably exceed that delivered to the shaft 11a and the driven shaft 13 will be rotated in the direction indicated by the arrow on the right of the worm 24. In the former case the quadrant lever 25 will move in the direction indicated by the arrow thereon, and in the latter case in the opposite direction.

The movements and position of the rod 28 are controlled by means of the differential linkwork 8, 29, 30, 31, 32, 33, 34, 35. This linkwork serves, when the wheel 1 is rotated, to displace the control rod 28 axially from the neutral position, thereby causing the driven shaft 13 to rotate in the appropriate direction and, when the shaft 13 has rotated the required amount, to return the control rod 28 once more to its neutral position so that the rudder will remain in the new position until the wheel 1 is again operated. This differential linkwork will now be described in detail. Pivotally connected to the middle of the floating lever 8 is one end of the rod 29, the other end of which is pivotally connected to the end of one arm 30 of the bell crank lever 30, 31 rockably mounted in a fixed frame member 36. The end of the arm 31 of the bell crank lever 30, 31, is provided with a transverse pin 37 which projects into a circumferential groove 38 in the end of the control rod 28. As has been mentioned above, one end of the floating lever 8 is pivotally connected to the screw-threaded rod 7. The other end of the lever 8 is pivotally connected to one end of a rod 32, the other end of which is pivotally connected to the end of one arm 33 of a bell crank lever 33, 34 rockably mounted in a fixed frame member 39. The end of the arm 34 of this bell crank lever is connected to the quadrant lever 25 by a link 35.

If the wheel 1 is rotated in the direction indicated by the arrow, the screw-threaded rod 7 will be displaced upwards and the lever 8 will pivot about its connection with the rod 32. The rod 29 will consequently be displaced upwards also and will cause the bell-crank lever 30, 31 to rock in the anti-clockwise direction (as seen in the figure), thereby displacing the control rod to the right. The effect of this movement of the control rod is to cause rotation of the driven shaft 13 in the direction indicated by the arrow on the left of the worm 24 and to move the quadrant lever 25 to the right. As the quadrant lever moves it pushes the link 35 to the right, with the result that the rod 32 is displaced axially downwards. The floating lever 8 now therefore rocks downwards about its connection with the screw-threaded rod 7 and gradually causes the control rod 28 to return to its neutral position. As soon as this position is reached, the torques transmitted by the two couplings A and B will balance one another and the driven shaft 13 will come to rest. A corresponding effect is obtained by the linkwork when the wheel 1 is rotated in the opposite direction.

Additional linkwork 40, 41, 42 is also shown in Fig. 1, whereby the motor 10 can be accelerated when the wheel 1 is rotated to a new angular position and retarded again as soon as the rudder has attained the desired position. This linkwork consists of a lever 40 fixed for rotation with the bell crank lever 30, 31 and of two links 41, 42 pivotally connected at one end to the free end of the lever 40. The other ends of the links 41, 42 are formed with slots 43, 44 which fit over pins 45, 46 which project laterally from the contact arm 47 of a rheostat 48 which serves as a controller for the motor 10. When the control rod 28 is in its neutral position, the contact arm 47 of the rheostat 48 is held in the low speed position by a spring 49. If, however, the rod 28 is moved to the right or left in the figure the link 41 or the link 42 will cause the contact arm 47 to move to a position such that the speed of the motor increases. As the control rod 28 returns to the neutral position the contact arm 47 will move back gradually to the low speed position.

The arrangement shown in Fig. 1 may be modified, as shown in Fig. 4, by making the motor drive a shaft 74 connected by gearing 71a, 70a, 16a, 15a, 14a and 71b, 70b, 16b, 15b, 14b to an independently rotatable impeller in each coupling in such a manner that the impellers are driven at equal speeds in opposite directions. In this modified arrangement the runners are fixed to one and the same shaft 9' which is connected to the rudder post by reduction gearing consisting of a bevel pair 60, 61, a shaft 62, a second bevel pair 63, 64 and a shaft 13' to which is fixed the worm 24'. The linkwork through which the coupling is controlled is similar in this case to that shown in Fig. 1.

Fig. 2 illustrates a "back-to-back" coupling provided with ring valves and a common reservoir chamber and shows details of one form of control mechanism for operating the ring valves. This coupling will now be described as though it were the coupling A, B in Fig. 1, similar references being used to denote corresponding parts in both figures; it must be understood, however, that such a coupling is suitable, with or without minor modifications, for use in a large number of other servo-control systems.

The "back-to-back" coupling illustrated in Fig. 2 comprises two hydraulic couplings A and B the vaned impeller elements 50a, 50b of which are arranged "back-to-back" and are fixed to flanges 51a, 51b on a common driving shaft 9. The impeller elements 50a, 50b are provided with annular flanges 52a, 52b which are bolted together so as to form a common reservoir chamber 53 between the two impeller elements. The impeller elements are also bolted to covers 54a, 54b within which are arranged vaned runner elements 55a, 55b. The two runner elements 55a, 55b are fixed respectively to flanges 12a, 12b, on two hollow shafts 11a and 11b which are coaxial with the driving shaft 9 and are journalled in bearing bushes 27a and 27b carried in supporting frame members 56a, 56b. Fixed to the ends of the hollow shafts 11a, 11b are bevel wheels 14a, 14b which mesh with bevel wheels 15a, 15b fixed to one end of shafts 16a, 16b journalled in bearings 17a, 17b respectively (see also Fig. 1). The impellers 50a, 50b are provided with ring valves 57a, 57b and with tubes 58a, 58b which extend into the centres of the vortex rings of the couplings A, B to permit liquid to pass into the reservoir chamber 53 from the working circuits of the couplings when the associated ring valves are in the operative or closed positions (as shown in Fig. 2) and from the reservoir chamber to the working circuit of either coupling when its associated ring valve is in the inoperative or open position. Both couplings are also provided with tubes 59a, 59b, through which air can pass either to take the place of or when displaced by the liquid leaving or entering the working circuits of the coupling.

The ring valves 57a, 57b are normally held in the closed position by means of a spring 60 disposed between them. In the hubs of the ring valves 57a, 57b are fixed bolts 61a, 61b which project into slots 62 in the driving shaft 9. A control rod 28 is arranged for axial sliding movement in the hollow interior of the driving shaft 9 and is provided near the middle of the coupling with a part 63 of reduced cross-section which accommodates the ends of the bolts 61a, 61b. When the rod 28 is moved axially to the right in Fig. 2 its left end moves the pins 61a to the right and opens the ring valve 57a, but at the same time leaves the ring valve 57b closed. When however, the rod 28 is moved axially to the left, it engages the pins 61b and opens the ring valve 57b leaving the ring valve 57a closed. The operation of the arm 31, transverse pin 37 and groove 38 has already been explained with reference to Fig. 1.

The characteristics of a "back-to-back" coupling such as that shown in Fig. 2, when the shaft 9 is driven by a constant speed driving motor, are indicated graphically in Fig. 3. In this figure the ordinate represents units of torque, where one unit equals the torque transmitted by either of the "back-to-back" couplings considered separately, when its ring valve is shut and the driven shaft is stationary, and the abscissa represents the speed of the coupling runners as a percentage of the speed of the impellers. Curves a and b indicate respectively how the torque delivered by the couplings A and B vary with the speed of their runners when their respective ring valves are open, while c and d are respectively similar curves for the same couplings when their ring valves are closed. It will be seen from this figure how, when both ring valves are closed, each coupling transmits an equal and opposite unit torque f, so that the common driven shaft 13 (Fig. 1) will remain stationary. If now the ring valve of coupling A is opened, the torque delivered by its runner will rise to a value e and the starting torque transmitted to the common driven shaft will be equal to e—f. The driven shaft will therefore commence rotating and the runners of the two couplings will rotate at equal speeds in opposite directions. When the speed of the runners retains a value equal for example to 40% of that of the impellers, the torque transmitted by the coupling A will drop to a value e' and at the same time the opposite torque transmitted by the coupling B will attain a negative value f' and the torque transmitted to the common driven shaft 13 (Fig. 1) will be equal to e'—f'.

When the "back-to-back" coupling is driven by a variable speed driving motor, as in Fig. 1, the ratios of starting and running torques to idling torque will be somewhat higher, with the result that a more immediate response will follow any control operation.

I claim:

1. A power transmission system comprising a driving member adapted to rotate continuously, a displaceable driven member, two hydraulic power transmitters of the kinetic type each having a vaned impeller element, a vaned runner element, a hydraulic working circuit including said elements and controllable throttling means which are disposed within the transmitter, which normally obstruct the vortex circulation of working liquid in said circuit and which can be operated to render said circuit unobstructed, transmission elements connecting said impeller elements to said driving member and said runner elements to said driven member and so arranged that said hydraulic power transmitters tend to displace said driven member in opposite directions respectively, and a control member operatively connected with both of said throttling means and capable of moving them to render the respective hydraulic circuits alternatively unobstructed.

2. A power transmission system comprising a driving member adapted to rotate continuously, a displaceable driven member, two hydraulic power transmitters of the kinetic type each having a vaned impeller element, a vaned runner element, a hydraulic working circuit including said elements and controllable throttling means operable for varying the vortex circulation of working liquid in said circuit, transmission elements connecting said impeller elements to said driving member and said runner elements to said driven member and so arranged that said hydraulic power transmitters tend to displace said driven member in opposite directions respectively, and control means connected with both of said throttling means and operable to render alternatively both of said hydraulic circuits obstructed and either one of said circuits alone unobstructed.

3. A power transmission system comprising a driving member adapted to rotate continuously, a displaceable driven member, two hydraulic power transmitters of the kinetic type each having a vaned impeller element, a vaned runner element, a hydraulic working circuit including said elements and a valve element which normally obstructs the vortex circulation of working liquid in said circuit, said impeller elements being connected for rotation with said driving member, transmission elements drivably connecting said runner elements with said driven member and constraining said runner elements to rotate in opposite directions, and a control member coupled to both of said valve elements and capable of moving them alternatively from an operative to an inoperative position.

4. A reversing servo control mechanism comprising a driving member adapted to rotate continuously, a driven member displaceable in a forward direction and in a reverse direction, two hydraulic power transmitters of the kinetic type each having a vaned impeller element, a vaned runner element, a hydraulic working circuit including said elements and controllable throttling means operable for varying the vortex circulation of working liquid in said circuit, said two throttling means being operable independently of each other, transmission elements connecting said impeller elements to said driving member and said runner elements to said driven member and so arranged that said hydraulic power transmitters tend to displace said driven member in opposite directions respectively, an actuating member which is connected with both of said throttling means, which normally occupies a neutral position in which said throttling means are both operative, said actuating member being movable one side and the other of a neutral position to move the one and the other of said throttling means respectively to an inoperative position while allowing the remaining throttling element to remain fully operative, a control member, and differential mechanism connecting said control member, said actuating member and said driven member.

5. A hydraulic power transmission system comprising a driving motor, a controller for varying the speed of said motor, a displaceable driven member, two hydraulic power transmitters of the kinetic type each having a vaned impeller element, a vaned runner element, a hydraulic working circuit including said elements and controllable throttling means operable for varying the vortex circulation of working liquid in said circuit, transmission elements connecting said impeller elements to said driving motor and said runner elements to said driven member and so arranged that said hydraulic power transmitters tend to displace said driven member in opposite directions respectively, a common actuating member for both of said throttling means, which normally renders them both operative and is displaceable one side and the other of its normal position to render them alternatively inoperative, and a connection between said controller and said actuating member for retarding said motor when both said circuits are throttled.

6. A reversing servo control mechanism comprising a driving motor, a controller for varying the speed of said motor, a displaceable driven member, two hydraulic power transmitters of the kinetic type each having a vaned impeller element, a vaned runner element, a hydraulic working circuit including said elements and controllable throttling means operable for varying the vortex circulation of working liquid in said circuit, transmission elements connecting said impeller elements to said driving motor and said runner elements to said driven member and so arranged that said hydraulic power transmitters tend to displace said driven member in opposite directions respectively, an actuating member connected with both of said throttling means and movable one side and the other of a neutral position to render said throttling means alternatively inoperative, a connection between said controller and said actuating member for retarding said motor when both said circuits are throttled, a control member, and differential mechanism connecting said control member, said actuating member and said driven member.

7. A power transmission system comprising a driving member adapted to rotate continuously, a displaceable driven member, two hydraulic power transmitters of the kinetic type each having a vaned impeller element, a vaned runner element, a hydraulic working circuit including said elements and controllable throttling means operable for impeding the vortex circulation of working liquid in said circuit, transmission elements connecting said impeller elements to said driving member and said runner elements to said driven member and so arranged that said hydraulic power transmitters tend to displace said driven member in opposite directions respectively, a control member coupled to each of said throttling means by a one-way connection arranged to operate in the direction which renders the throttling means inoperative, and resilient means urging said throttling means into their operative position.

8. A hydraulic power transmission system comprising a driving shaft adapted to rotate continuously, a driven shaft, two hydraulic power transmitters of the kinetic type each having a vaned impeller element fixed to said shaft, a vaned runner element, a hydraulic working circuit including said elements, and a ring valve slidable into and out of said circuit for varying the circulation of working liquid therein, a gear train connecting said runner elements together and constraining them to rotate in opposite directions, said gear train including said driven shaft, and control mechanism comprising mechanism which normally retain both of said ring valves operative in the respective circuits and means for alternatively retracting said ring valves.

9. A hydraulic power transmitter of the kinetic type comprising a shaft, two hydraulic couplings each having two elements each comprising an annularly dished shell containing vanes, the two elements of each coupling being juxtaposed to form a toroidal circuit for working liquid, the two couplings being disposed co-axially with said shaft in spaced relation, and the vaned element of each coupling that is nearer the other coupling being fixed to said shaft, a reservoir disposed between said couplings and constrained to rotate with said shaft, ducts communicating between said reservoir and said circuits, throttling means displaceable within said circuit, and control means operatively connected with said throttling means for throttling said circuits alternatively.

10. A hydraulic power transmitter comprising a shaft, four co-axial elements having annularly dished shells provided with vanes in their hollow faces, two of said elements being fixed to said shaft and disposed back to back in spaced relationship, and the other two of said elements being independently rotatable and disposed face to face with said back-to-back elements respectively to form two toroidal working circuits, two casings respectively fixed to said back-to-back elements and completely enclosing the backs of said independently rotatable elements respectively, a common reservoir disposed between and rotatable with said back-to-back elements, ducts communicating between said reservoir and said circuits, and means utilizing the energy of motion of working liquid in said circuits to transfer liquid through said ducts.

11. A hydraulic power transmitter comprising a shaft, four co-axial elements having annularly dished shells provided with vanes in their hollow faces, two of said elements being fixed to said shaft and disposed back to back in spaced relationship, and the other two of said elements being independently rotatable and disposed face to face with said back-to-back elements respectively to form two toroidal working circuits, a common reservoir disposed between and rotatable with said back-to-back elements, ducts communicating between said reservoir and said circuits, two throttling members slidable through apertures in said back-to-back elements to throttle said circuits respectively and retractable into said common reservoir chamber, and control means for alternatively retracting said throttling members.

12. A power transmission system comprising a driving member adapted to rotate continuously, a displaceable driven member, two hydraulic power transmitters of the kinetic type each having a vaned impeller element, a vaned runner element, and a hydraulic working circuit including said elements, transmission elements connecting said impeller elements to said driving member and said runner elements to said driven member and so arranged that said hydraulic power transmitters tend to displace said driven member in opposite directions respectively, a common reservoir chamber communicating with both of said circuits and having a capacity less than that of either of said circuits, and control means operable for transferring liquid at will from either of said circuits to said reservoir chamber.

13. A power transmission system comprising a driving member adapted to rotate continuously, a displaceable driven member, two hydraulic power transmitters of the kinetic type each having a vaned impeller element, a vaned runner element, a hydraulic working circuit including said elements and controllable means for varying the torque transmission capacity from a substantial minimum value to a maximum value, transmission elements connecting said impeller elements to said driving member and said runner elements to said driven member and so arranged that said hydraulic power transmitters tend to displace said driven member in opposite directions respectively and a control member which is connected with said controllable means, which normally maintains the torque transmission capacities of both of said hydraulic power transmitters at said minimum value and which is operable for alternatively increasing the torque transmission capacities of said transmitters.

14. Reversing gearing comprising a driving shaft, a driven shaft, a forward drive transmission between said shafts, a reverse drive transmission between said shafts in parallel with said forward drive transmission, each of said transmissions including a hydraulic turbo-coupling of the type adapted to operate with a substantially constant liquid content, and each of said turbo-couplings having a throttling element operable for reducing the torque transmission capacity thereof, and said two throttling elements being displaceable independently of each other between their operative and inoperative positions, and control mechanism including means for retaining said throttling elements simultaneously operative and means for rendering said throttling elements alternatively inoperative.

15. Reversing gearing comprising a driving motor, a speed controller therefor, a driven shaft, a forward drive transmission between said shafts, a reverse drive transmission between said shafts in parallel with said forward drive transmission, each of said transmissions including a hydraulic coupling of the kinetic type, and each of said couplings having control means operable for varying the torque transmission capacity thereof, and a common actuating member connected to said speed controller and both of said coupling control means, said actuating member being displaceable to either side of a neutral position to accelerate said motor and to the one and the other side of the neutral position to actuate respectively the one and the other of said coupling control means in the same sense.

16. A servo reversing system comprising a driving motor, a speed controller therefor, a driven shaft, a forward drive transmission between said shafts, a reverse drive transmission between said shafts in parallel with said forward drive transmission, each of said transmissions including a hydraulic coupling of the kinetic type, and each of said couplings having control means operable for varying the torque transmission capacity thereof, a common actuating member connected to said speed controller and both of said coupling control means, said actuating member being displaceable to either side of a neutral position to accelerate said motor and to the one and the other side of the neutral position to actuate respectively the one and the other of said coupling control means in the same sense, an operator's control member, and differential mechanism interconnecting said driven shaft, said actuating member and said operator's control member.

HAROLD SINCLAIR.